United States Patent [19]

Miu et al.

[11] Patent Number: 4,783,735

[45] Date of Patent: Nov. 8, 1988

[54] LEAST RECENTLY USED REPLACEMENT LEVEL GENERATING APPARATUS

[75] Inventors: Ming T. Miu, Chelmsford; Thomas F. Joyce, Westford; Jian-Kuo Shen, Belmont; Forrest M. Phillips, North Chelmsford, all of Mass.

[73] Assignee: Honeywell Bull Inc., Waltham, Mass.

[21] Appl. No.: 810,945

[22] Filed: Dec. 19, 1985

[51] Int. Cl.⁴ .............................................. G06F 12/02
[52] U.S. Cl. .................................................... 364/200
[58] Field of Search ... 364/200 MS File, 900 MS File

[56] References Cited

U.S. PATENT DOCUMENTS 3,601,812  8/1971  Weisbecker ........................ 364/200
3,806,883  4/1974  Weisbecker ........................ 364/200

Primary Examiner—Gareth D. Shaw
Assistant Examiner—Rebecca L. Adams
Attorney, Agent, or Firm—Faith F. Driscoll; John S. Solakian

[57] ABSTRACT

A least recently used replacement level generator is constructed to include n number of register stages connected in tandem. A comparison circuit associated with each stage except the last stage compare the contents of that stage with an input level value which is to be loaded into the input stage. In the absence of an identical comparison, each stage generates a shift enable signal which is passed on to the next succeeding stage. An identical comparison inhibits the generation of the shift enable signal. Therefore, when a clock signal is applied to the device, register stages, in the presence of a control signal, cause the input level to be loaded into the input stage while the level contents of the register stages are simultaneously shifted through successive stages including the register stage whose contents are identical to the input level under the control of the shift enable signal. The contents of the output register stage accurately and instantaneously defines the least recently used replacement level for use by a cache memory.

9 Claims, 3 Drawing Sheets

LEAST RECENTLY USED REPLACEMENT LEVEL GENERATING APPARATUS

RELATED PATENT APPLICATIONS

1. Patent application entitled, "Paged Virtual Cache System", bearing Ser. No. 06/811,044, filed on even date and assigned to the same assignee as named herein, now allowed.

BACKGROUND OF THE INVENTION

1. Field of Use

The present invention relates to apparatus used by a cache memory and more particularly to apparatus for replacing information within the locations of such cache memory.

2. Prior Art

It is well known to interpose a cache memory between a central processing unit and main memory. Such arrangements improve the performance of the processing unit by providing fast access to instructions and data stored in the cache memory. During normal operation, when the instructions or data requested by the processing unit are not stored in cache, the block containing the requested information is fetched from main memory. When the cache memory is filled, new blocks replace old blocks resident therein.

While different arrangements may be used to select old blocks of information, a least recently used (LRU) replacement has been one of the most commonly used schemes employed in data and instruction cache units. These units include cache memories and address directory circuits. The memories are organized into a number of levels for storing information in the form of data and instructions for fast access. The directory circuits contain address information for identifying which blocks of instructions and data are stored in the cache memory levels. Generally, the LRU replacement scheme has been implemented using a round robin counter or first in first out (FIFO) array. In such arrangements, the assignment of a group or block of locations is made sequentially.

While such arrangements have been generally easy to implement, they are unable to provide any accurate record of order of block usage. To overcome these disadvantages, one system employs a memory for storing a number of least recently used bits to represent the order of usage of memory locations. This system is disclosed in U.S. Pat. No. 4,334,289.

When implemented as an array, the updating of entries can be time-consuming, particularly when there are a large number of cache level entries. Moreover, the delays in updating reduce cache system performance and result in least recently used approximation.

Accordingly, it is a primary object of the present invention to provide apparatus for replacing information within a memory on a least recently used basis.

It is a further object of the present invention to provide apparatus capable of generating signals for rapid and accurate assignment of levels on a least recently used basis.

SUMMARY OF THE INVENTION

The above and other objects of the present invention are achieved in an apparatus which is organized into n number of register stages connected in tandem. A comparison circuit associated with each register stage except the last stage compares the contents of that stage with an input level value provided by a cache memory which is to be loaded into the input stage. In the absence of an identical comparison, each stage generates a shift enable signal which it passed on to the next succeeding stage. An identical comparison inhibits the generation of the shift enable signal.

Therefore, when a clock signal is applied to the device, the register stages, in the presence of a replacement control signal, cause the input level to be loaded into the input stage while the level contents of the register stages are simultaneously shifted through successive stages including the register stage whose contents are identical to the input level. Such shifting takes place under the control of the shift enable signal. The contents of the output register stage can be used by the cache memory to accurately and instantaneously define the least recently used replacement level into which information blocks may be stored.

By keeping a record of the status of all of the assignable levels (i.e., the most recently used, the next most recently used, etc., the last most recently used) and being able to switch these values instantaneously, the device can accurately and rapidly provide an output specifying the least recently used level. In that sense, the device operates as a shifting content addressable memory (CAM).

In the preferred embodiment, the cache memory can take the form of the memories disclosed in the copending patent application entitled, "Paged Virtual Cache System", bearing Ser. No. 06/811,044, filed on even date and assigned to the same assignee as named herein. The cache memory applies a page level number to the input register stage of the device along with a hit signal. When so applied, the device operates to generate the required page number level value for assigning pages on a least recently used basis.

Since the shifting of register contents is done in parallel, the only delays are those of the series of gates which pass the shift enable signal through successive register stages. When constructed using VLSI technology, the delays are minimal. The organization of the apparatus of the present invention due to its repetitive stages is very well suited to VLSI technology.

In addition to high speed and ease of construction, the apparatus of the present invention can be readily expanded to accommodate increases in the number of levels. This can be accomplished with minimal increase in added circuits.

The novel features which are believed to be characteristic of the invention both as to its organization and method of operation, together with further objects and advantages will be better understood from the following description when considered in connection with the accompanying drawings. It is to be expressly understood, however, that each of the drawings are given for the purpose of illustration and description only and are not intended as a definition of the limits of the present invention.

DESCRIPTION OF THE PREFERRED EMBODIMENT

Figure 1:
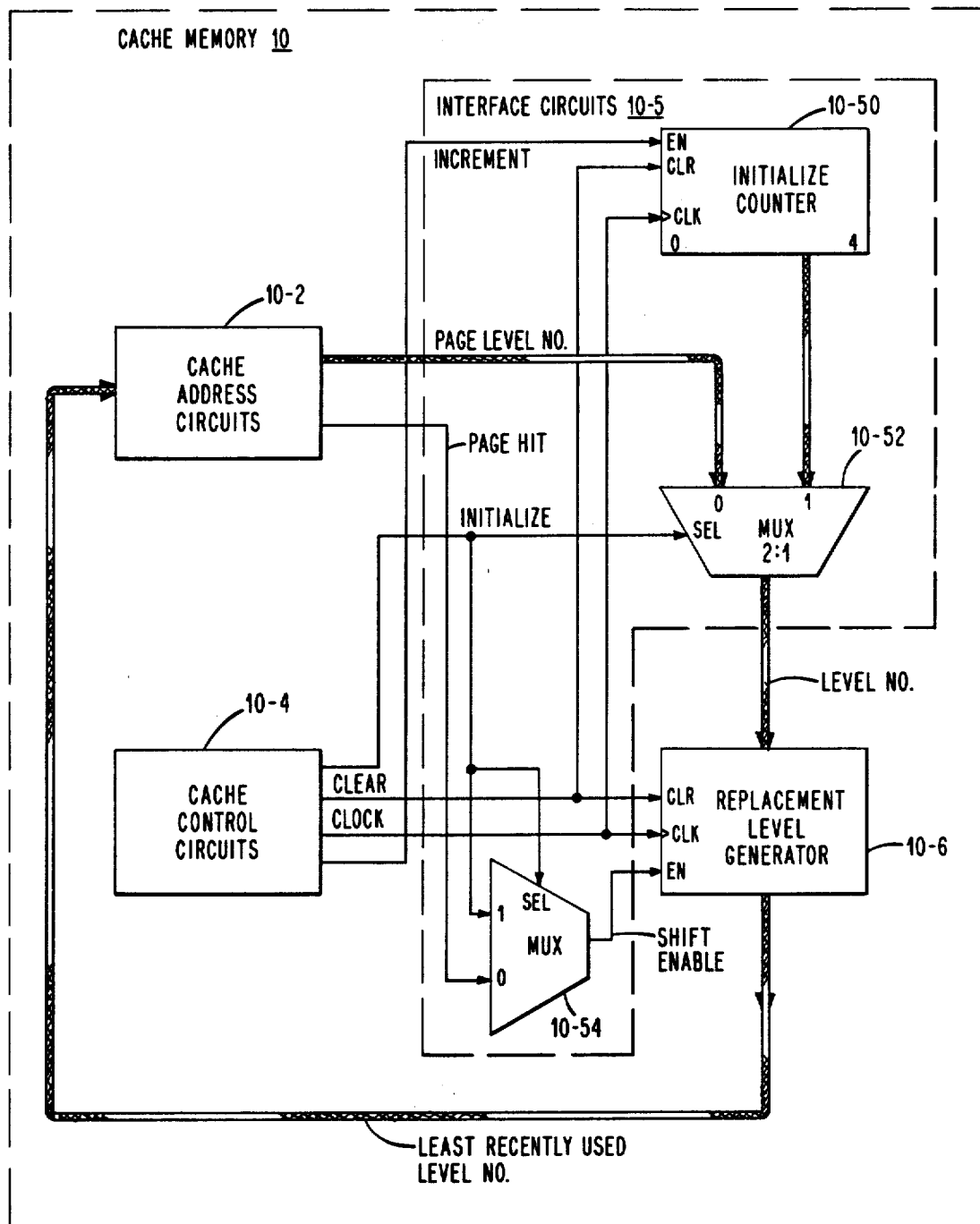
FIG. 1 illustrates in block form a cache memory which includes the apparatus of the present invention.

As seen from FIG. 1, the cache memory 10 which includes the replacement level generator 10-6 of the present invention includes cache address circuits 10-2, cache control circuits 10-4 and the interface circuits of block 10-5. The cache address circuits 10-2 store address information specifying where the pages and blocks of data words or instructions are stored in a cache page random access memory (RAM) not shown. These circuits, in response to a request for instructions or data, operate to generate a page hit signal and page level number value upon detecting that the requested information resides in the page RAM. As shown, these signals are applied as inputs to the interface circuits of block 10-5.

The cache control circuits 10-4 generate the required control and clock signals for processing requests. These signals are distributed to different parts of cache memory 10 including the interface circuits 10-5 and generator 10-6. As shown, these signals include an initialize signal generated when cache memory 10 is powered up, a clear signal for resetting cache memory registers, an increment signal, and a clock signal which establishes overall cache timing. For further details concerning the circuits of blocks 10-2 and 10-4, reference may be made to the referenced related copending patent application.

As shown, the interface circuits 10-5 include an initialize counter 10-50 and a pair of two input data selector circuits 10-52 and 10-54 whch are connected as shown. The clear signal clears the contents of counter 10-50 to ZEROS while the increment signal is used to enable the counter 10-50 to increment its contents by one in response to each clock signal.

In response to an initialize signal applied to the input select terminals of selector circuits 10-52 and 10-54, both circuits are conditioned to select the output of initialize counter 10-50 and the initialize signal as outputs. In the absence of an initialize signal, the selector circuits 10-52 and 10-54, respectively, select the page level number value and page hit signal as outputs.

The output of selector circuit 10-52 applies a page level number value as a first input to generator 10-6. The output of selector circuit 10-54 applies a shift enable signal as a second input to generate 10-6. The generator 10-6 receives as further inputs, clear signal and a clock signal from the cache control circuits 10-4. The generator 10-6 provides as an output, a least recently used level number value as an input to the cache address circuits 10-2.

REPLACEMENT LEVEL GENERATOR 10-6

Figure 2:
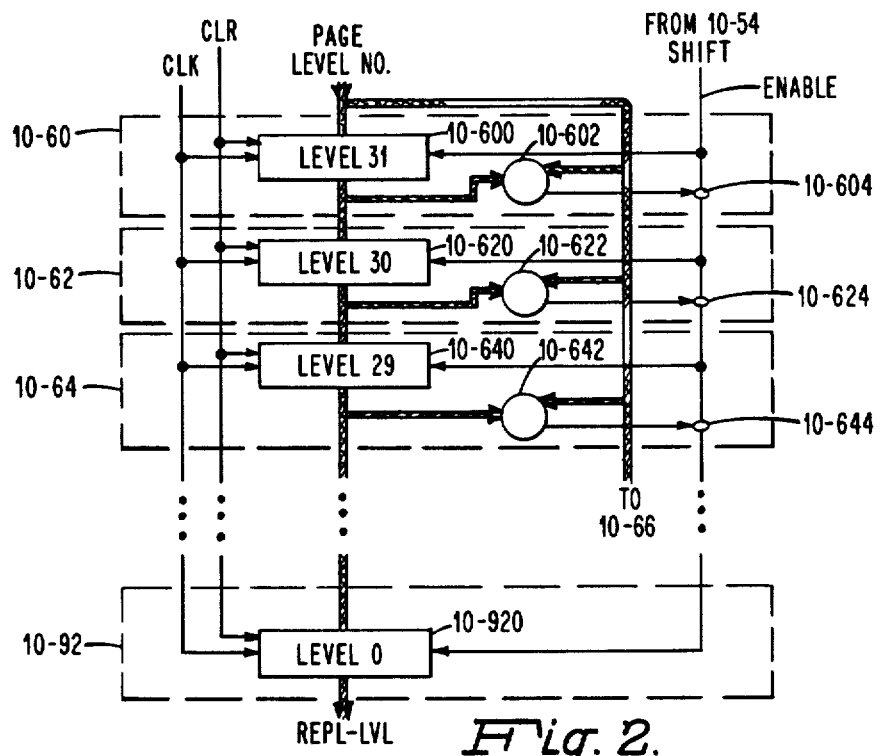
FIGS. 2 and 3 are block diagrams showing in greater detail, the apparatus of the present invention.

As shown in FIG. 2, generator 10-6 includes 32 register stages 10-60 through 10-92. Each stage includes a level register (e.g. 10-600). Each stage except the last also includes a comparison circuit (e.g. 10-602) and an AND gate (e.g. 10-604). As shown, each comparison circuit receives as one input, the level number value applied to input register stage 10-60 by selector circuit 10-52. As a second input, each comparison circuit receives the output level number contents of its stage register (e.g. 10-600).

The input enable signal is applied as an input to level register 10-600 and as one input of the AND gate 10-604 of the input stage which receives as a second input, the unequal ($\neq$) output from comparison circuit 10-602. AND gate 10-604 provides a shift enable output which connects to an enable input terminal of the next stage register 10-620 and to one input of the AND gate 10-624 of the next register stage 10-62. This AND gate receives the unequal ($\neq$) output from the comparison circuit 10-622 of that stage. As seen from FIG. 2, the remaining register stages are similarly connected in tandem.

Figure 3:
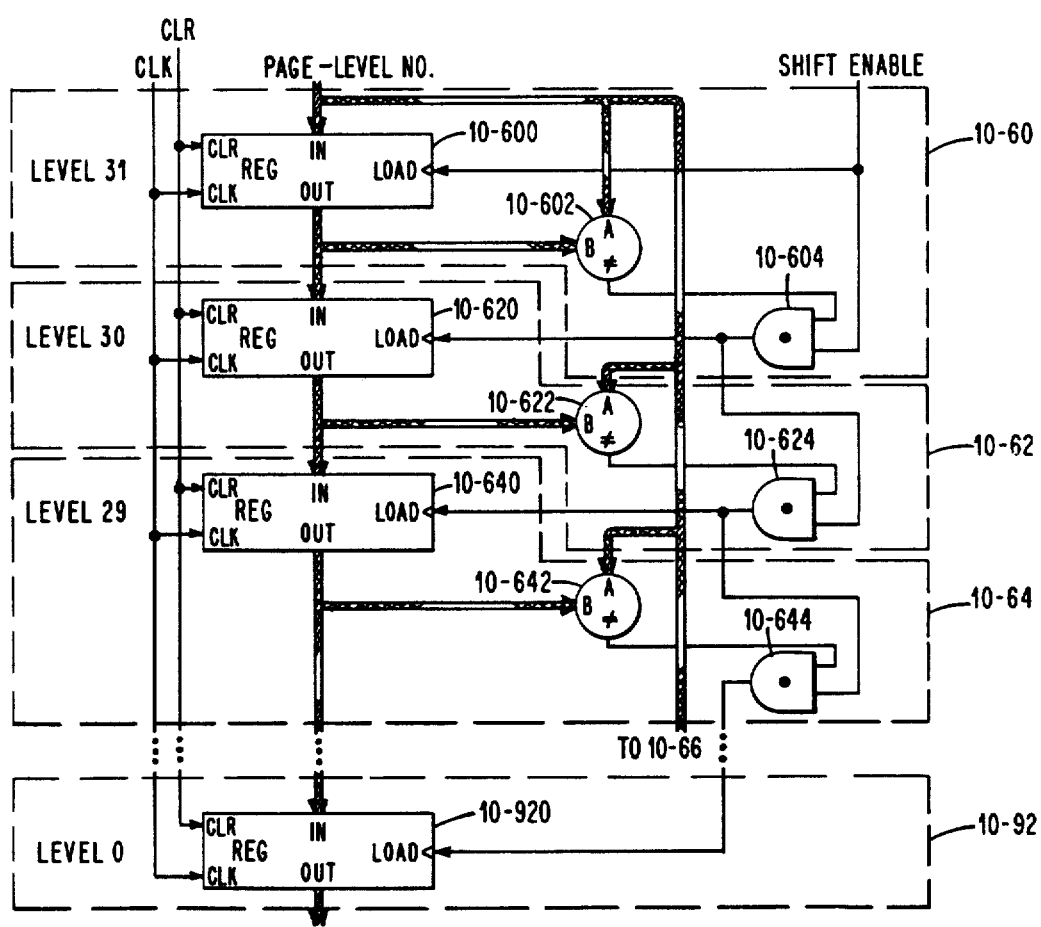

Additionally, the level register of each register stage, except the input register stage 10-60, receives clear and clock signals from the cache control circuits 10-4 and the output from the previous stage. As seen from FIG. 3, the clear and clock signals are applied to the clear (CLR) and clock (CLK) input terminals of each stage level register. FIG. 3 shows the different elements of the register stages in greater detail. For the purpose of the present invention, these elements can be constructed from well known integrated circuits or implemented in CMOS or MOS technology. For further information, reference may be made to the text entitled, "MOS Integrated Circuits," prepared by the Engineering Staff of American Micro-systems, Inc., Copyright 1972.

DESCRIPTION OF OPERATION

Figure 4:
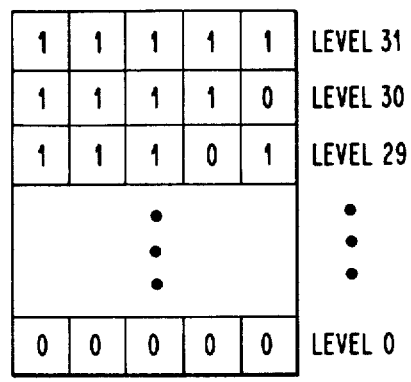
FIG. 4 is a diagram illustrating the organization of the apparatus of the present invention.
Figure 5:
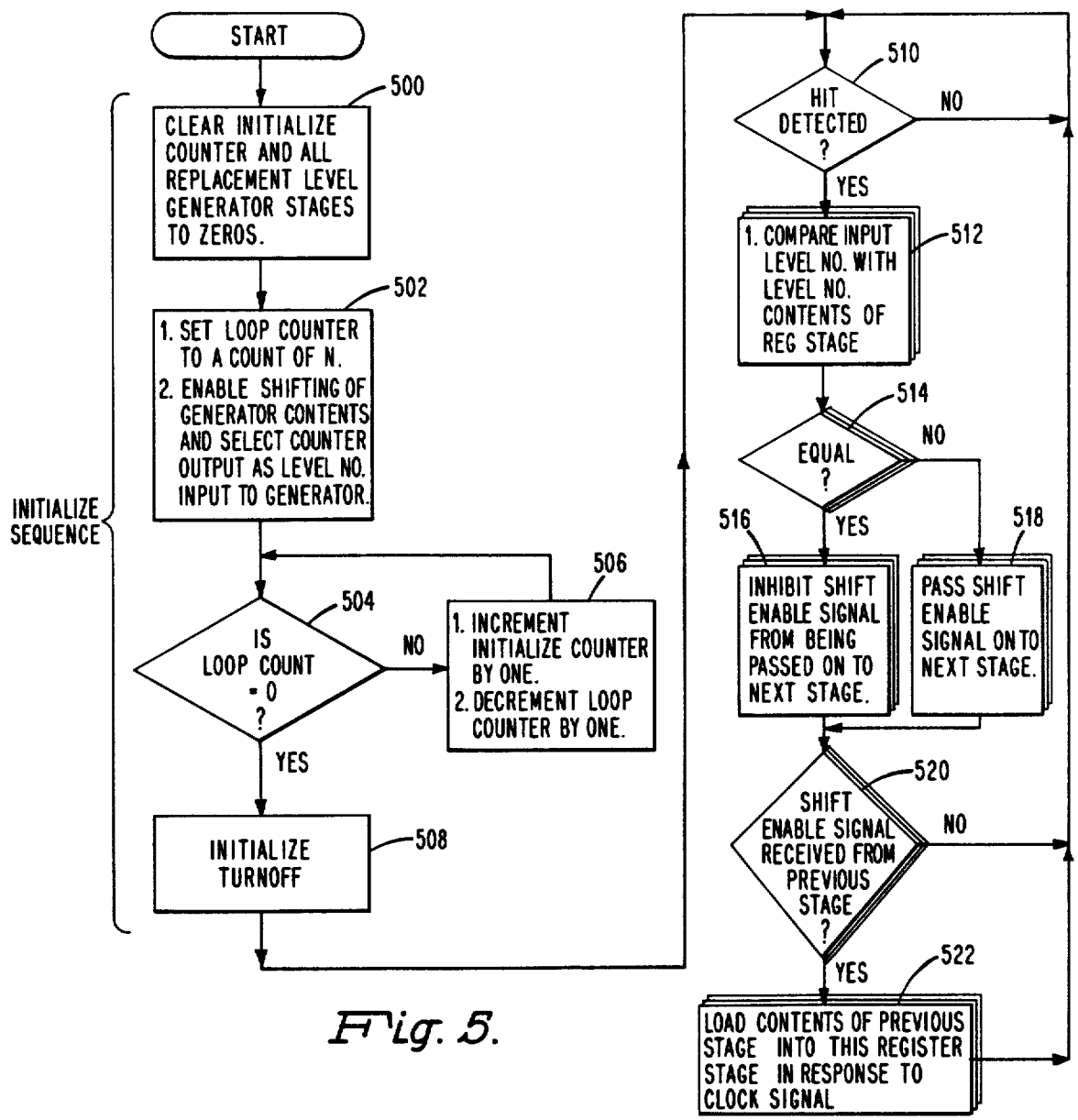
FIG. 5 is a flow diagram used in explaining the operation of the apparatus of the present invention.

With reference to FIGS. 1 through 4, the operation of the generator 10-6 will now be described in connection with the flow chart of FIG. 5. As seen from block 500 of FIG. 5, as part of an initialization sequence, the cache control circuits 10-4 force clear signal to a binary ONE. This clears the intitialize counter 10-50 and all of the stage registers of generator 10-6 to binary ZEROS. Next, the cache control circuits 10-4 set an internal loop counter to a count equal to N where N has the binary value of "11111". As seen from block 502, the cache control circuits 10-4 force the initialize signal to a binary ONE. This conditions the selector circuits 10-52 and 10-54 to select as outputs, the contents of initialize counter 10-50 and the binary ONE initialize signal.

As seen from FIG. 3, this causes the binary value of "00000" from initialize counter 10-50 to be applied to the input of stage register 10-600. This value is loaded into register 10-600 in response to a first clock signal. Since the inputs applied to comparison circuit 10-602 are equal (i.e., both all ZEROS), no further transfers of levels take place between register stages.

As seen from block 504, cache control circuits 10-4 test the loop counter contents. Since its contents do not equal zero, the circuits 10-4 decrement the loop counter by one and increment the initialize counter 10-50 by one. The blocks 504 and 506 are repeated until the loop count has been decremented to ZERO. At that time the register stages 0 through 31 store the 32 binary values 00000 through 11111 as shown in FIG. 4.

The initialize sequence is completed when the cache circuits 10-4 reset the initialize signal to ZERO. When the initialize signal is a ZERO, selector circuits 10-52 and 10-54 select the page level number value and page hit signals as inputs to generator 10-6.

The generator 10-6 remains in an initialized stage until the cache address circuits 10-2, in response to a request for data or instructions, detect a hit indicating that the requested information is stored in cache memory 10. At that time, the cache address circuits 10-2 force the page hit signal to a binary ONE and the page level number to a value designating the most recently used level value (i.e., where the hit occurred).

As seen from block 510, when a hit is detected, this causes the comparison circuit of each register stage to compare the input page level number value to the level contents of its stage register. When they are not equal, the comparison circuit conditions the AND gate of that stage to pass a shift enable signal onto the next register stage as indicated in block 518. When the comparison circuit detects that the inputs are equal, it inhibits the same AND gate from passing the shift enable signal onto the next register (block 516).

As seen from block 520, when the shift enable signal from the preceding register stage is received by a register stage, this causes the contents of the register of the preceding stage to be loaded into the register of that stage in response to a clock signal. At the same time, the most recently used level value is loaded into register 10-600 of input stage 10-60. Thus, the transfer of levels through the register stages occurs instantaneously. The result is that the level contents are shifted through successive stages up to and including the register stage whose comparison circuit detects that the contents of its register are identical to the input level. The simultaneity of operations performed by the different register stages are represented in FIG. 5 by the series of lines in blocks 512 through 522.

The above operation can be best illustrated by the following example. It is assumed that the input page level number value has the binary value "11101" and that the register stages of generated 10-6 contain the binary values shown in FIG. 4. This means that the page hit signal will enable the binary value "11101" to be loaded into stage register 10-600 and that the comparison circuit 10-602 and the AND gate 10-604 will enable the "11111" contents of stage register 10-600 to be loaded into stage register 10-620.

At the same time, the comparison circuit 10-622 and the AND gate 10-624 will enable the "11110" contents of stage register 10-620 to be loaded into stage register 10-640. However, the "11101" contents of stage register 10-640 will not be loaded into the register of the next stage, since the comparison circuit 10-642 will detect an identical comparison and the AND gate 10-644 will inhibit any further transfer of the shift enable signal. The generator 10-6 will provide as an output from stage register 10-920, a least recently used value stored in the level 0 register stage which corresponds to the binary value "00000".

As seen from the above, the generator of the present invention provides an accurate and reliable way of generating values for indicating the order of usage of memory locations, such as in a cache memory on a least recently used basis. In operation, the generator can provide the required values essentially instantaneously. Also, it has the additional advantages of being simple and inexpensive to construct using modern technologies.

Many changes may be made to the preferred embodiment of the present invention. For example, the number and size of the register stages may be increased or decreased. To increase the speed of operation in the case of a large number of stages, appropriate carry lookahead circuits or other types of speed-up circuits may be included. It will be obvious to those skilled in the art that the generator of the present invention may be used with other types of memories or devices and, hence, with other types of interface circuits.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. An apparatus for generating signals designating the least recently used level for use in a cache memory having a plurality of levels, each level containing a plurality of addressable locations, and said cache memory including circuits for generating a page hit signal indicative of hit being detected indicating that the data requested has been located in said cache memory and a page level number coded for indicating the level in which said hit occurred, said apparatus comprising:

a number of register stages including an input stage and an output stage, each of said stages for storing a different replacement level value and being connected in tandem and each stage having only a clocked single multibit register for storing said different replacement level value;

input means coupled to said cache memory for receiving said page hit signal and said page level value for indicating said level in which said hit condition occurred, said input means being enabled during normal operation to transfer said page level value and said page hit signal as replacement level value and shift enable signal inputs respectively to said input stage multibit register;

means for simultaneously applying a single clock signal to each of said stage registers;

each of said register stages except said output stage further including:

a comparison circuit having an output and first and second sets of inputs respectively coupled to receive said different replacement value stored in said each stage multibit register and to receive from said input means, said page level number value; and, logic gating means having first and second inputs and an output, said first and second inputs being connected to receive said shift enable signal and to said output of said comparison circuit respectively and said output being connected to both a first input of a logic gating means and an input to a stage multibit register of a next adjacent stage, said comparison circuit of each stage generating an output signal for indicating when there is the absence of an identical comparison between said page level value and said different replacement value stored in said each stage multibit register for enabling said logic gating means to transfer and apply said shift enable signal as said first input to said logic gating means and to said multibit register of said next adjacent stage;

said input means being inhibited by said absence of said page hit signal from applying said shift enable signal to said input stage thereby preventing any change in the stored different replacement level value contents of said number of stage multibit registers in response to said clock signal; and said input and the remaining ones of said number of stages of multibit registers in response to said clock signal and said shift enable signal applied from said outputs of said logic gating means, loading said page level value into said multibit register of said input stage and simultaneously shifting the stored different replacement level contents through successive stages of said multibit registers up to and including the stage whose comparison circuit detected said identical comparison and inhibited said logic gating means from transferring and applying said shift enable signal to said multibit register and to said first input of said logic gating means of said next adjacent stage and any remaining stages, thereby providing at said output stage register within a minimum of time following the transfer of said hit signal, a replacement value which accurately represents said least recently used replacement level within said cache memory.

2. The apparatus of claim 1 wherein said gating means includes only an AND gate.

3. The apparatus of claim 1 wherein said apparatus further includes initialization circuit means coupled to said input means, said initialization circuit means including:
  means for generating a predetermined sequence of replacement level values having the binary values 0 through n wherein n corresponds to said number of stages, said binary values 0 through n for establishng the relative priorities of said cache levels; and wherein said input means includes:
  first gating means for applying said sequence of replacement values to said input stage register; and,
  second gating means for continuously applying said shift enable signal to said input stage register, said stage registers being successively conditioned by said shift enable signal to load different ones of said replacement level values in said predetermined sequence in response to successive occurrences of said clock signal resulting in the storage of said values n through 0 in said registers of said input stage through said output stage.

4. The apparatus of claim 3 wherein said means for generating includes a multibit binary counter having enable and clock input terminals, said counter in response to an increment signal applied to said enable input terminal to generate said predetermined sequence of said replacement values in response to said successive occurrences of said clock signal being applied to said clock input terminal.

5. The apparatus of claim 3 wherein said cache memory further includes address circuits and said first gating means includes a selector circuit having first and second data inputs, a control input and an output coupled to said input register stage, said first and second data inputs being connected to said cache address circuits and to said means for generating respectively and said control input being connected to receive an initialization control signal, said selector circuit being conditioned by said control signal to apply signals from said means for generating to said output and in the absence of said control signal, said selector circuit being conditioned to apply signals corresponding to most recently used values from said cache address circuits to said output.

6. The apparatus of claim 5 wherein said cache memory further includes cache control circuits coupled to said first gating means, said cache control circuits being operative to generate said control signal for indicating the initialization of said cache memory for establishing said priorities of said levels.

7. The apparatus of claim 3 wherein said cache memory further includes cache address circuits and cache control circuits, said second gating means including a selector circuit having first and second data inputs, a control input and output coupled to said input register stage, said first data input being connected to said cache address circuits, said second data input and said control input being connected to receive an initialization control signal from said cache control circuits specifying an initialization operation, said selector circuit being conditioned by said control signal to continuously apply to said output, said shift enable signal and said cache control circuits being operative to inhibit the generation of said control signal at the completion of said initialization operation, said selector circuit being enabled by said cache control circuits to apply said signals indicating the occurrence of page hits from said cache address circuits to said output.

8. A method of organizing a replacement level generator which accurately defines a least recently used replacement level value for use by a cache memory organized into n number of levels, each level including a plurality of addressable memory locations for storing information accessed in response to memory requests, said cache memory including circuits for generating each level containing a plurality of addressable locations, and said cache memory including circuits for generating a page hit signal indicative of hit being detected indicating that the data requested has been located in said cache memory and a page level number coded for indicating the level in which said hit occurred, said method comprising the steps of:
  (a) connecting in tandem, n number of stage registers including an input stage register and an output stage register representative of assignable levels n through 0;
  (b) applying said page hit signal as a shift enable signal to said input stage register and in tandem to the remaining registers;
  (c) initializing said number of stage registers to store replacement level values 0 through n respectively in the output stage 0 through input stage n for establishing the relative priorities by which the contents of storage locations within said levels of said memory are to be replaced;
  (d) simultaneously comparing said page number level value corresponding to the most recently used level with the level contents of each register except said output stage register;
  (e) generating an output signal indicating the result of such comparison within each stage except said output stage;
  (f) enabling for loading said input stage register and each stage register in succession for shifting in the absence of said output signal indicating an identical comparison by said shift enable signal only when said page hit signal designates that the information specified by a memory request resides in one of said levels; and,
  (g) loading input register stage with said page number most recently used value and simultanesouly shifting by loading, the level contents of the input stage and remaining stages through successive stages up to and including the stage which last generated said output signal indicative of having detected an identical comparison, with the level contents of previous stages in response to a single clock signal so that said output stage now stores the least recently used replacement value level with a minimum amount of time based upon a transfer of said shift enable signal through said n number of storage register and the use of said information.

9. The method of claim 8 wherein the operations of steps c through f are repeated for each new input level value in response to each occurrence of a clocking signal and said enabling of said input stage.

* * * * *